United States Patent [19]

Binley

[11] Patent Number: 4,504,511
[45] Date of Patent: Mar. 12, 1985

[54] PROCESS FOR FORMING EXTRUDED ICE CONFECTIONS AND PRODUCTS FORMED THEREBY

[75] Inventor: Gary N. Binley, Northamptonshire, England

[73] Assignee: Thomas J. Lipton, Inc., Englewood Cliffs, N.J.

[21] Appl. No.: 355,753

[22] PCT Filed: Jul. 31, 1981

[86] PCT No.: PCT/GB81/00137
§ 371 Date: Feb. 19, 1982
§ 102(e) Date: Feb. 19, 1982

[87] PCT Pub. No.: WO82/00241
PCT Pub. Date: Feb. 4, 1982

[30] Foreign Application Priority Data

Jul. 11, 1980 [GB] United Kingdom ............... 8022792

[51] Int. Cl.³ ........................ A23G 9/04; A23G 9/22
[52] U.S. Cl. ..................... 426/565; 426/249;
426/516; 425/191; 425/319; 425/376 B;
264/209.2; 264/281
[58] Field of Search ........... 426/565, 516, 249, 500;
425/191, 319, 376 B; 264/209.2, 281

[56] References Cited

U.S. PATENT DOCUMENTS

| | | | |
|---|---|---|---|
| 817,080 | 4/1906 | Mahoney | 264/209.2 |
| 1,628,251 | 5/1927 | Laskey | 426/516 |
| 1,714,234 | 5/1929 | Ost | 426/515 |
| 2,149,066 | 2/1939 | Orsini | 425/319 |
| 2,429,042 | 10/1947 | Bader | 425/319 |
| 3,008,187 | 11/1961 | Slade | 264/209.2 |
| 3,037,068 | 5/1962 | Wessel | 264/281 |
| 3,243,328 | 3/1966 | Britton et al. | 264/281 |
| 3,284,851 | 11/1966 | Zernay | 425/319 |
| 3,876,743 | 4/1975 | Soderlund et al. | 426/516 |
| 4,020,643 | 5/1977 | Roberts | 426/516 |

FOREIGN PATENT DOCUMENTS 1076117 10/1964 United Kingdom ............... 426/515

Primary Examiner—Jeanette Hunter
Attorney, Agent, or Firm—Brumbaugh, Graves, Donohue & Raymond

[57] ABSTRACT

A process for preparing an ice confection or other foodstuff with projecting and relatively recessed relief features of its outer surface, by extruding the ice confection or other extrudable edible material from a rotating extrusion nozzle having a cross-section with an assymetrical configuration with respect to the rotation axis, with the extruded material passing from the nozzle immediately into an unconfined space and on to an elongate travelling conveyor which does not share the rotational motion of the extrusion nozzle, thereby to lay down on the conveyor an extended spirally-formed extrudate with projecting and relatively recessed relief features derived from its extrusion through the nozzle of assymetrical configuration.

5 Claims, 10 Drawing Figures

PROCESS FOR FORMING EXTRUDED ICE CONFECTIONS AND PRODUCTS FORMED THEREBY

This invention relates to edible products and their preparation, and to apparatus therefor.

It is known to produce ice confections by extrusion in variegated form, see for example GB Patent Specification No. 1,169,500 (National Dairy Products Corporation), which describes a variegator for ice cream which entwines streams of ice cream with each other before they are extruded from an extrusion outlet. In the apparatus described therein, the variegation arises purely within the body of the extruded product, as a result of the presence of two materials of different composition. On the other hand, a number of techniques are known for producing ice confections and other food products in shapes possessing complex relief features, e.g. by the use of flexible moulds, as in GB Patent Specification No. 1,508,589. Some of these techniques can be difficult to apply with reliability and economy, and it remains a problem to find ways to manufacture food products of decorative shape on an industrial scale.

It is the aim of the present invention to make and provide extruded ice confections with spirally-formed projections and recessed relief features of their outer surface.

According to the invention this can be done by using a process for preparing an extruded ice confection with spirally-formed projecting and relatively recessed relief features of its outer surface, comprising extruding the ice confection material from a rotating extrusion nozzle having a cross-section with an assymmetrical configuration with respect to the rotation axis, with the extruded confection passing from the nozzle immediately into an unconfined space and on to an elongate travelling conveyor which does not share the rotational motion of the extrusion nozzle, thereby to lay down on the conveyor an extended (elongate) spirally-formed extrudate with projecting and relatively recessed relief features derived from its extrusion through the nozzle of assymmetrical configuration.

"Assymmetrical configuration" of the extrusion nozzle cross-section means a configuration which is not bounded by a concentric circular nozzle outline. For example, such an assymmetrical configuration of the cross-section can be provided by one or a plurality of eccentrically disposed nozzle outlets, e.g. two or three or up to about six, each of which can have a plain circular sectional outline or an outline of another shape, e.g. indented circular or noncircular. If desired, there can be a concentric circular nozzle outlet among the array of nozzle outlets: e.g. such an array can comprise one concentric circular nozzle outlet flanked by one or a plurality of eccentric circular or noncircular nozzle outlets. Other examples are described below.

The rotating extrusion nozzle can thus have an indented or other non-circular shape so that a spiral indentation, rib, or other spirally-formed feature of shape is given to the extruded frozen product.

In this process, the spiral formation is caused by interaction between the material leaving the extrusion nozzle outlets and a takeoff conveyor, and as will be seen below, the process allows a wide variety of decoratively shaped products to be made by process control and adjustment of the variables introduced by this process, e.g. nozzle rotation speed, extrusion rate, nozzle height and inclination, and takeoff conveyor speed.

The effect of such process control features was not available with the previously known variegators, and products of the kinds made accessible to manufacture using the present process could not be made by their use.

In carrying out embodiments of the invention, a plurality of rotating nozzle can be used to produce more complex shapes. The nozzles can be fed with ice confections of different composition, flavour, or colour to produce further variegation in the product. The nozzles can for example rotate about the same axis or different axes at the same speed or at different speeds, and can rotate in the same or opposite direction of rotation.

Coalescence of the product streams (where there are more than one) gives a composite product of complex shape which can then be chopped into segments, hardened in a freezing tunnel or equivalent and wrapped. If desired, sticks can be inserted so that the segments can be eaten off a stick. The nozzle extrusion rates, where more than one, can be the same or different. Further control of the product form can be achieved by chopping or pressing the extruded product. In further variations, the products, where mainly for example of frozen ice cream, can have strands or centres of another material, e.g. toffee or a material of toffee-like consistency, e.g. as described in GB Patent Specification No. 1,439,143. Other decorative inserts and textural effects can be included as desired.

Apparatus according to the invention, for making an extruded ice confection (with spirally-formed projecting and relatively recessed relief features of its outer surface) includes an inlet supply line for extrudable foodstuff leading to at least one rotating eccentrically mounted extrusion nozzle, or other extrusion nozzle with an assymmetrical configuration with respect to the rotation axis, an open space to allow the confection passing from the nozzle to pass immediately into an unconfined space, and a conveyor such as a moving belt for conveying the extruded foodstuff away from the extrusion nozzle. The extrudate can if desired be cut and have sticks or handles inserted before being hardened. Other decoration and textural effects can be applied as desired, to the extruded product with spirally-formed projecting and relatively recessed relief features of its outer surface which itself forms part of the invention.

It is important to ensure that outlet nozzles where more than one are so placed as to allow formation of an integral product extrudate, e.g. by coalesence or cohesion where two extrusion nozzles are used. For example, the nozzle outlets can be immediately adjacent; or their feed passageways can, if desired, meet and be without a dividing wall between them for a little distance in advance of the nozzle outlets themselves. Subject to this requirement the individual nozzles can be individually controlled as regards extrusion parameters such as extrusion rate and temperature and other product parameters to impart desired variation to the product. The number of nozzles can for example be from two up to six.

The product can if desired be extruded intermittently. Variation, e.g. pulsation, in extrusion pressure can be used to obtain a ripple effect in the product. The shape of the spiral bands in the product can be controlled according to the relative speeds of rotation and extrusion. The overall shape of the product can be varied and controlled by alteration of the conveyor belt speed relative to the extrusion rate.

The extrusion nozzles can be orientated to extrude either horizontally, e.g. parallel to the horizontal direction of movement of the takeoff conveyor, or vertically downwards on to the takeoff conveyor, or obliquely, and can be spaced above the level of the conveyor by a suitable distance allowing a spirally-formed product to settle on the conveyor. For example, suitable such distances can be comparable with or less than the nozzle diameter, e.g. from almost touching the conveyor to about 3 or more nozzle diameters above, and can be adjusted to adjust the form of the product.

Where the extrusion is of ice cream, the ice cream stream or streams to the extrusion nozzle or nozzles can be independent or common.

Examples of processes and products in accordance with illustrative embodiments of this invention are given below, and described with reference to the accompanying drawings.

Figure 1:
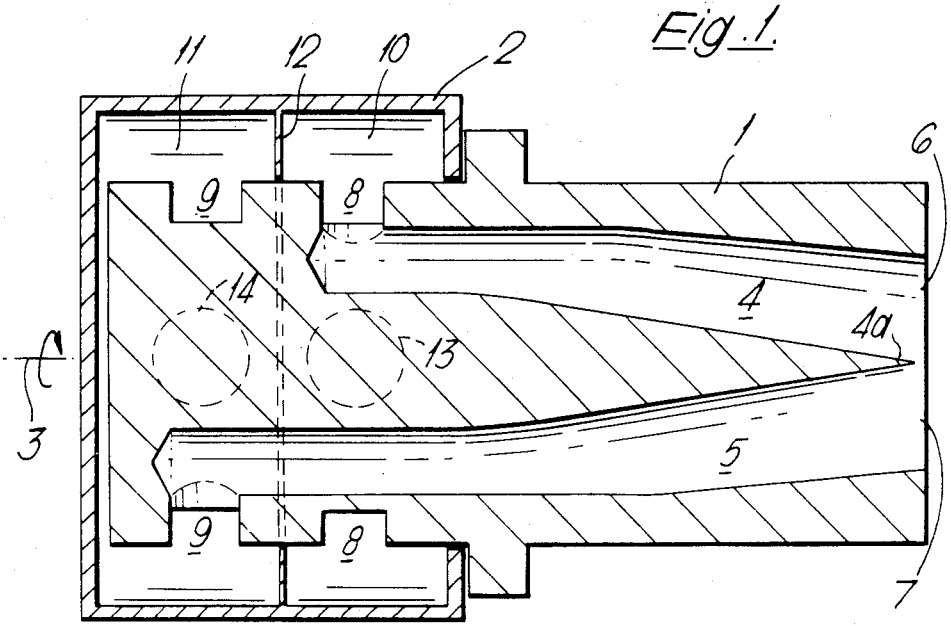
FIG. 1 shows part of an extrusion device according to an embodiment of the invention for making ice confections according to an embodiment of this invention, in diagrammatic part cross-section parallel to the axis of rotation.

Referring to the drawings, FIG. 1 shows a generally cylindrical rotatory nozzle body 1 mounted in a casing 2 for rotation about an axis 3. Nozzle body 1 has two slightly convergent passageways 4 and 5 therein, having respective circular outlet ends 6 and 7 opening adjacent to one another. Preferably passageways 4 and 5 meet a little before (instead of exactly at) the outlet ends, as shown at 4a, to encourage coalescence of the extrudate streams. Passageways 4 and 5 open at their other ends into respective annular recesses 8 and 9 axially spaced apart and extending inwardly into nozzle body 1. Annular recesses 8 and 9 respectively communicate with annular chambers 10 and 11 separated by annular partition 12 in casing 2. Gaskets, bearings and connectors are provided (not shown) to allow nozzle body 1 to rotate with chambers 10 and 11 remaining sealed from contact with each other but in continuous open communication with respective passage-ways 4 and 5 and respective outlets 6 and 7.

Casing 2 (static) bears static inlet ports (detail not shown) in positions denoted by circles 13 and 14 so that separate steams of extrudable materials can be fed into chambers 10 and 11 from inlet lines from a conventional ice cream freezer attached to the respective ports at 13 and 14. Motor drive is connected through appropriate gearing and flexible coupling (detail not shown) to drive rotatory nozzle body 1 about axis 3.

The assembly shown is mounted (preferably adjustably) above a conventional conveyor belt to receive extrudate emerging from adjacent outlets 6 and 7 where the two outlet streams coalesce or adhere to form a spiral rope product, e.g. of ice cream extruded at about −5° C., which can then be chopped into segments, and hardened in freezing tunnel.

Figure 2:
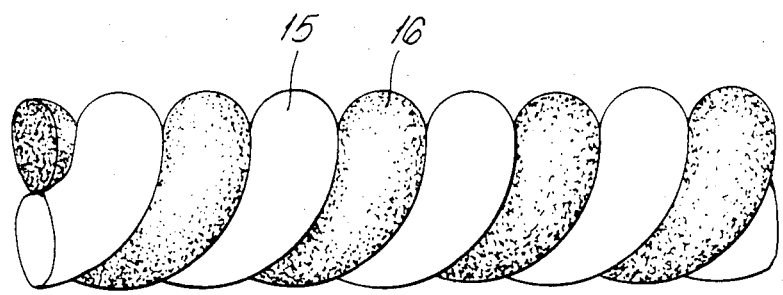
FIG. 2 shows an example of a spirally-formed ice confection made with the extrusion device of FIG. 1, in the manner described herein.
Figure 3:
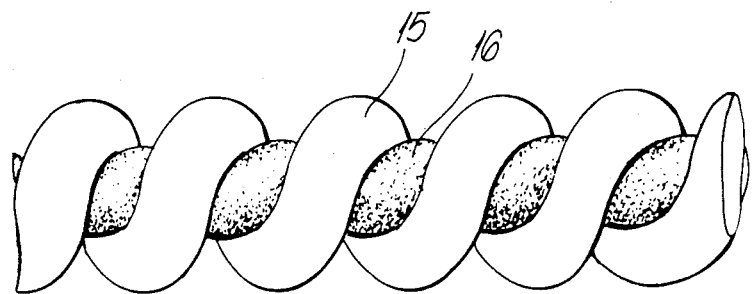
FIGS. 3, 4, 5 and 6 show, in diagrammatic perspective from above, further examples of spirally-formed ice confections which can all be made with the extrusion device shown in FIG. 1, in the manner described herein.
Figure 4:
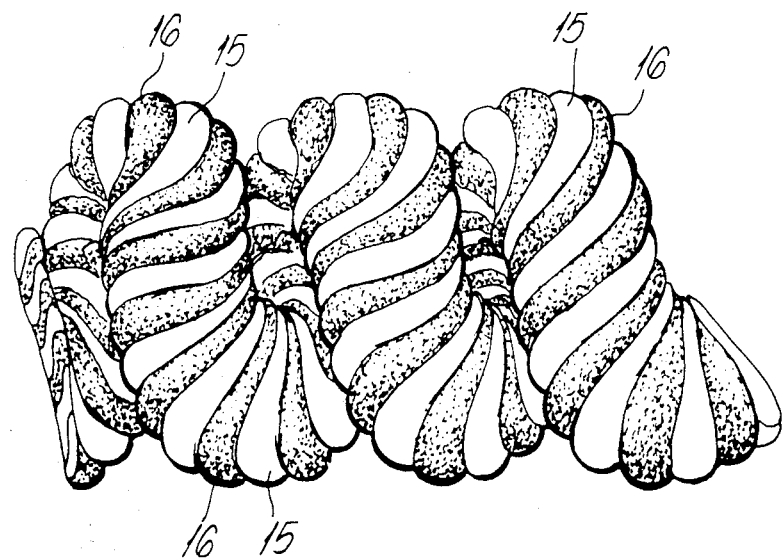

An example of such an extrudate is seen in FIG. 2, with ice cream rope strands 15 and 16 of different colours adherent or coalescent together, derived from outlets 6 and 7, fed from respective inlet supply lines connected at 13 and 14 in FIG. 1.

Figure 5:
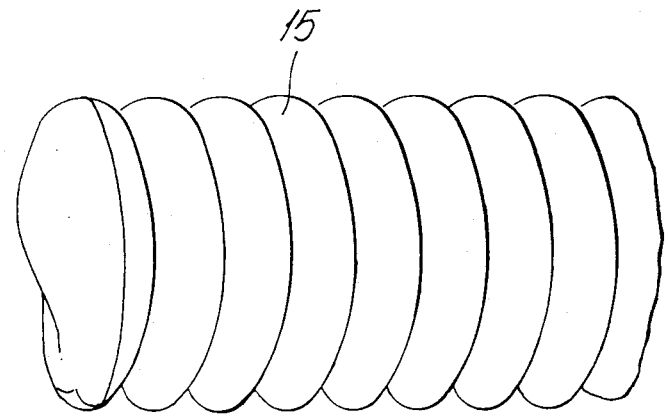

The wide-ranging capability of the arrangements described herein for producing extruded products of a variety of decorative forms is shown for example by FIGS. 2-6. In these Figures, extruded products are shown which comprise adherent or coalescent extrusion ropes, streams or strands of different colours, 15 and 16 from respective one or another of the two outlets of the extrusion device shown in FIG. 1. In each case a standard ice cream formulation was extruded at −4.5° C. To make the product of FIG. 2, the extrusion nozzle was rotated at 380 rpm. The direction of extrusion was horizontal, and in the line of the conveyor, the extrusion rate was about 2.5 kg of product per minutes, and the conveyor takeoff speed was about 10 meters per minute. The extrusion rates through the two nozzle outlets were equal. The product of FIG. 3 was made by changing the ratio of extrusion rates through the two nozzles from 1:1 to 3:1, other conditions remaining unchanged. The product of FIG. 4 was made with equal extrusion rates through the two nozzles, by increasing the nozzle rotation rate to 400 rpm and reducing the conveyor belt takeoff rate to 1.8 meter/min. The height of the extrusion nozzle was adjusted so that the spiral-form coil extrudate oscillated in the open space between the extrusion nozzle and the point at which it settled on the conveyor to produce a coiled-coil arrangement. FIG. 5 shows the extruded output of a single outlet only out of the two outlets shown in FIG. 1, at 95 rpm and a takeoff rate of 1.8 metre/min.

Figure 6:
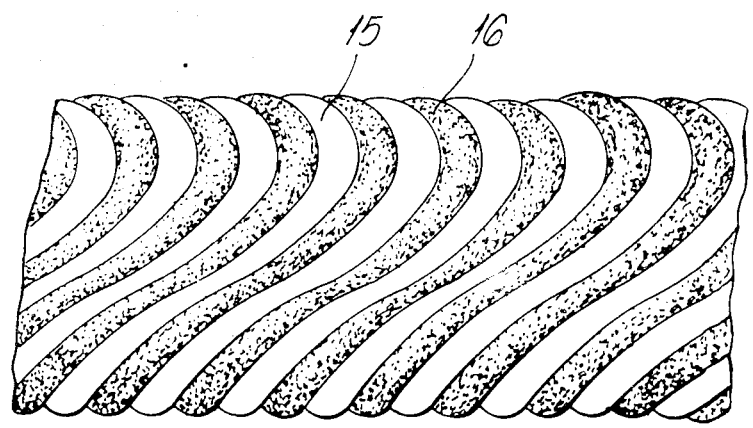

FIG. 6 shows the extruded output of the device of FIG. 1 when mounted in a vertical orientation, so that the spirally-formed extrusion settled vertically on the conveyor before its lateral removal at a rate of 2 metre/minute. The rotation rate was 150 rpm. This product had a cross-section showing a striking decorative striped pattern and its spiral formations were plastically deformed by the lateral direction of conveyor removal. It is clear that the spiral interweaving of the still plastically deformable extrudates in an unconfined space after leaving the nozzle outlets, and without the application of substantial external shear forces, allows formation of a wide range of useful decorative product shapes. The decoration can be emphasised by means of contrasting textures and colours for the different streams.

The product spiral pitch can be reduced by increasing rotation speed relative to conveyor rate, or increased by relatively reducing the rotation speed. The radius of each rope can be increased by increasing its extrusion rate relative to the conveyor rate.

Further variation of the form of product decoration can be imparted by the use of alternative extrusion devices as shown in FIGS. 7-8 and 9-10. Each of these pairs of Figures shows in diagrammatic form a nozzle adaptor intended to be fixed to the rotating outlet end of an extrusion device which is as indicated in FIG. 1 except that it is fitted with three outlet nozzles instead of two, each with passageway, inlet and corresponding fitments analogous to those of the device of FIG. 1, and with their outlet ends disposed in equilateral triangular configuration equally spaced about the axis of rotation of the extrusion nozzle.

Figure 7:
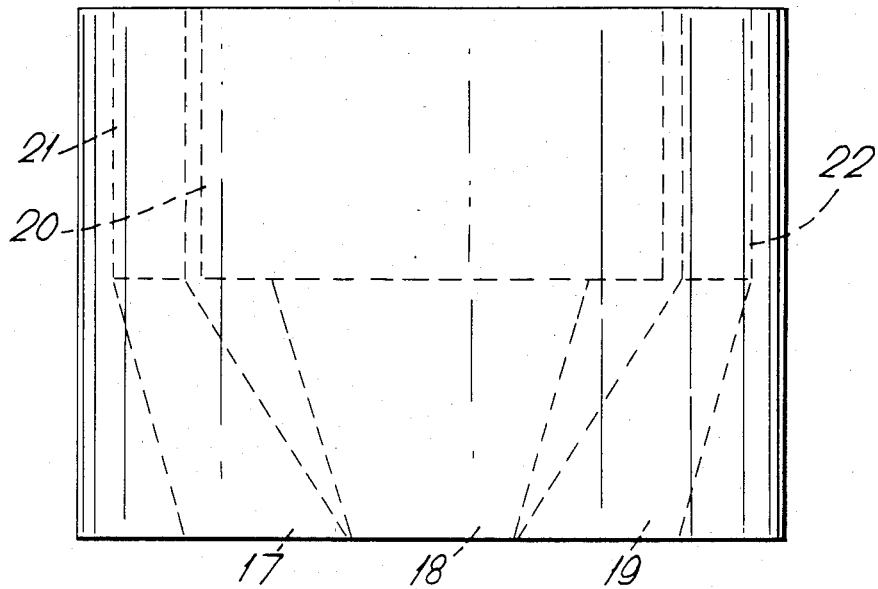
FIGS. 7 and 8 show a diagrammatic section and plan respectively of an alternative form of extrusion device.
Figure 8:
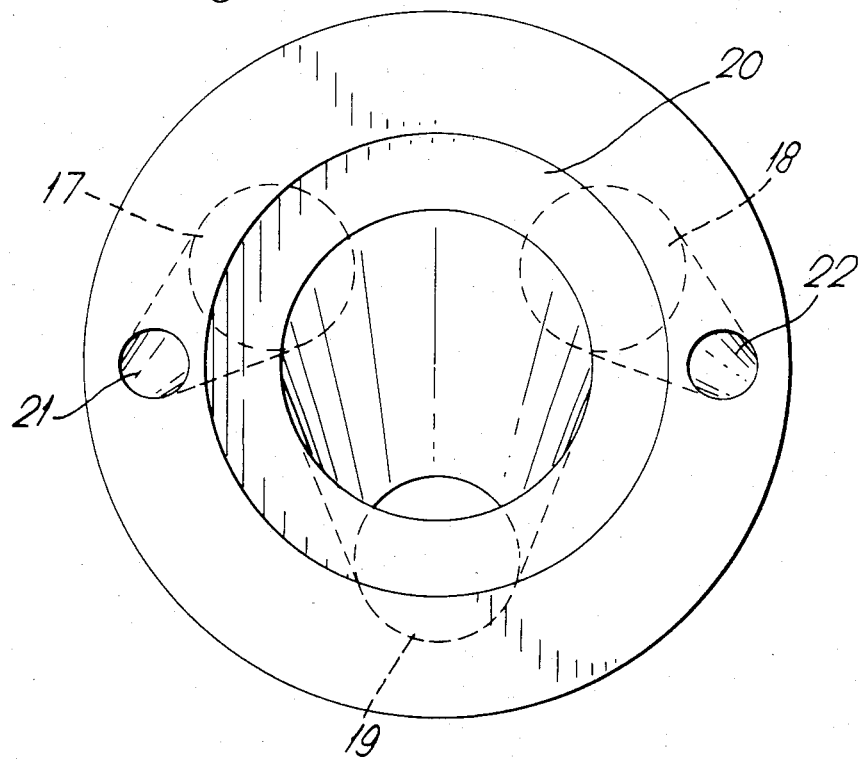

FIGS. 7 and 8 show respectively in section and plan a nozzle adaptor with three inlets 17, 18 and 19 arranged to mate with and fix to the equilaterally disposed extrusion nozzle outlets (fixing details now shown). These three inlets lead via corresponding passageways respectively to a central large outlet 20 and two smaller peripheral outlets 21 and 22. This adaptor can be machined from stainless steel or from suitable inert synthetic plastics material. It is fixed to the main extrusion nozzle and rotates with it, and allows production of a wide range of decorative shaped extruded products corresponding for example to those of FIGS. 2–6 but based on a relatively large central core and spirally-formed peripheral ropes or strands.

Figure 9:
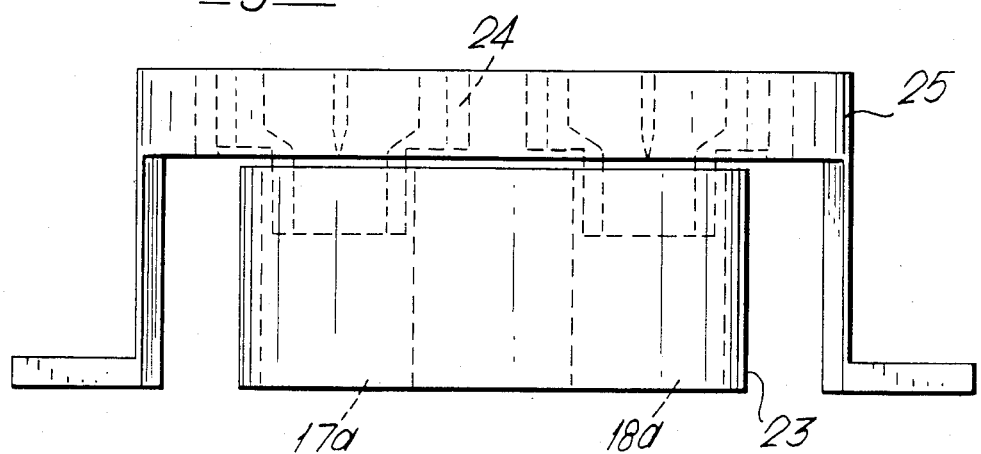
FIGS. 9 and 10 show a diagrammatic section and plan respectively of an adaptor to make a further alternative form of extrusion device in which epicyclic rotation is imparted to subdivided extrusion steams.
Figure 10:
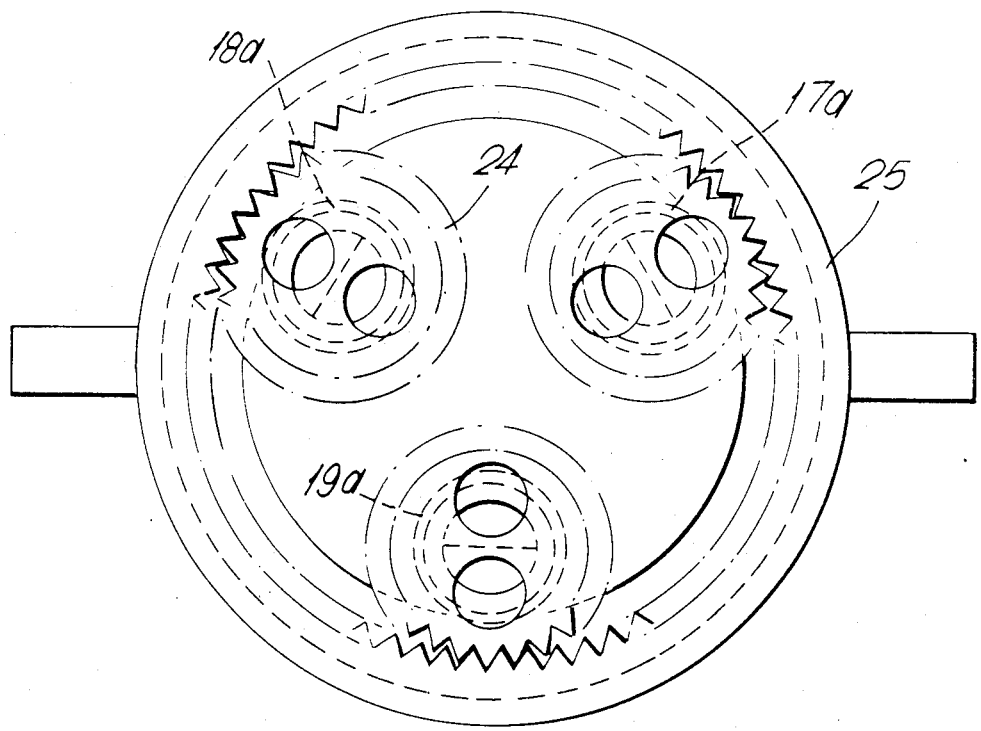

FIGS. 9 and 10 show respectively in section and in plan a further nozzle adaptor with three inlets 17a, 18a, 19a in an adaptor body 23 matching and fixing with the main extrusion nozzle outlets (fixing details not shown). These inlets lead via passageways in body 23 to independently rotatable eccentric nozzle pieces (one indicated at 24) geared to a fixed frame 25 which does not rotate with the extrusion nozzle so that the eccentric nozzle pieces like 24, each with two eccentric outlets like 26, 27, are carried in further epicyclic motion about their respective axes to create another helter-skelter, coiled-coil or roped-rope pattern in the shape of the corresponding decorated extruded products.

The invention is capable of further modifications and variations: in particular, foodstuffs other than ice cream or confectionery can be extruded in the manner described herein.

I claim:

1. A process for preparing an ice confection with projecting and relatively recessed relief features on its outer surface, comprising the steps of extruding the ice confection material from a rotating extrusion nozzle having a cross-section with an assymmetrical configuration with respect to the rotation axis, passing the extruded material from the nozzle immediately into an unconfined space and on to an elongate travelling conveyor which does not share the rotational motion of the extrusion nozzle, and thereby laying down on the conveyor an extended spirally-formed extrudate with projecting and reltively recessed relief features derived from its extrusion through the nozzle of assymmetrical configuration.

2. A process according to claim 1, comprising the steps of extruding the ice confection from a rotating extrusion nozzle selected from the group consisting of a nozzle with an indented circular outline, a nozzle with a non-circular outline and a nozzle which comprises one to six eccentrically disposed nozzle outlets.

3. A process according to claim 1 or 2 comprising the steps of oscillating the spiral extrudate in the unconfined space between the nozzle and conveyor to produce and lay down on the conveyor an extended spirally-formed extrudate of coiledcoil configuration.

4. An extruded ice confection comprising spirally-formed projecting and relatively recessed relief features of its outer surface.

5. An extruded ice confection according to claim 4, comprising a spirally-formed coiled-coil configuration.

* * * * *